(12) United States Patent
Brevdo et al.

(10) Patent No.: US 11,188,395 B2
(45) Date of Patent: Nov. 30, 2021

(54) COMPUTATIONAL GRAPH CRITICAL SECTIONS

(71) Applicant: Google LLC, Mountain View, CA (US)

(72) Inventors: Eugene Brevdo, San Bruno, CA (US); Alexandre Tachard Passos, San Francisco, CA (US)

(73) Assignee: Google LLC, Mountain View, CA (US)

( * ) Notice: Subject to any disclaimer, the term of this patent is extended or adjusted under 35 U.S.C. 154(b) by 76 days.

(21) Appl. No.: 16/695,884

(22) Filed: Nov. 26, 2019

(65) Prior Publication Data

US 2020/0167207 A1    May 28, 2020

Related U.S. Application Data

(60) Provisional application No. 62/772,544, filed on Nov. 28, 2018.

(51) Int. Cl.
*G06F 9/52* (2006.01)
*G06F 9/46* (2006.01)
(Continued)

(52) U.S. Cl.
CPC .......... *G06F 9/52* (2013.01); *G06F 9/46* (2013.01); *G06F 9/466* (2013.01); *G06F 9/467* (2013.01); *G06F 9/48* (2013.01); *G06F 9/4806* (2013.01); *G06F 9/50* (2013.01); *G06F 9/5005* (2013.01); *G06F 9/5016* (2013.01); *G06F 9/5022* (2013.01); *G06F 9/5038* (2013.01);
(Continued)

(58) Field of Classification Search
CPC . G06F 9/52; G06F 9/522; G06F 9/524; G06F 9/526; G06F 9/46; G06F 9/466; G06F 9/467; G06F 9/48; G06F 9/4806; G06F 9/50; G06F 9/5005; G06F 9/5016; G06F 9/5022; G06F 9/5036; G06F 16/901; G06F 16/9024; G06F 9/5038
See application file for complete search history.

(56) References Cited

U.S. PATENT DOCUMENTS 7,490,218 B2   2/2009  Eggers et al.
2005/0273782 A1 * 12/2005 Shpeisman ............... G06F 9/52
                                                        718/100

(Continued)

OTHER PUBLICATIONS

Masticola et al., "Non-concurrency Analysis", Department of Computer Science, Rutgers University, 1993, ACM, pp. 129-138 (Year: 1993).*

(Continued)

*Primary Examiner* — Charles M Swift
(74) *Attorney, Agent, or Firm* — Fish & Richardson P.C.

(57) ABSTRACT

Methods, systems, and apparatus, including computer programs encoded on computer storage media, for implementing critical section subgraphs in a computational graph system. One of the methods includes executing a lock operation including providing, by a task server, a request to a value server to create a shared critical section object. If the task server determines that the shared critical section object was created by the value server, the task server executes one or more other operations of the critical section subgraph in serial. The task server executes an unlock operation including providing, by the task server, a request to the value server to delete the shared critical section object.

22 Claims, 6 Drawing Sheets

(51) Int. Cl.
*G06F 9/48* (2006.01)
*G06F 9/50* (2006.01)
*G06F 16/901* (2019.01)

(52) U.S. Cl.
CPC .............. *G06F 9/522* (2013.01); *G06F 9/524* (2013.01); *G06F 9/526* (2013.01); *G06F 16/901* (2019.01); *G06F 16/9024* (2019.01)

(56) References Cited

U.S. PATENT DOCUMENTS

| 2009/0307466 | A1* | 12/2009 | Bareness | G06F 9/528 |
| | | | | 712/220 |
| 2015/0026688 | A1* | 1/2015 | Dice | G06F 9/4843 |
| | | | | 718/102 |
| 2015/0058071 | A1* | 2/2015 | Pottlapelli | G06F 16/9574 |
| | | | | 705/7.26 |
| 2015/0205646 | A1* | 7/2015 | Singh | G06F 9/526 |
| | | | | 718/106 |
| 2018/0011650 | A1* | 1/2018 | Litke | G06F 3/067 |

OTHER PUBLICATIONS

Denizov, Sheyn, "Analyzing the Impact of Concurrency on Scaling Machine Learning Programs Using TensorFlow," (2017) *Theses and Dissertations* 2570, http://preserve.lehigh.edu/etd2570.

\* cited by examiner

COMPUTATIONAL GRAPH CRITICAL SECTIONS

CROSS-REFERENCE TO RELATED APPLICATION

This application claims priority to U.S. Provisional Application No. 62/772,544, filed on Nov. 28, 2018. The disclosure of the prior application is considered part of and is incorporated by reference in the disclosure of this application.

BACKGROUND

This specification relates to constructing and processing computational graphs

A computational graph includes nodes, control edges, and data edges. Each node represents a respective computational operation to be performed.

The edges in a computational graph are directed edges. Each data edge, which may also be referred to as a data dependency, represents a flow into a node of one or more elements of data. When all inputs required for the operation are available to the node, the node's operation can be executed.

Each control edge, which may also be referred to as a control dependency, that connects a first node to a second node represents that the operations of the first node cannot be executed until the operations of the second node are complete. Thus, a data edge can also have the same effect of a control edge between two nodes that pass data from one node to the other. However, a control edge can also exist between nodes that do not have a data edge.

A computational graph can be executed by a distributed computing system. Each of one or more machines in the distributed computing system can execute the operations of one or more nodes in the computational graph, and the machines can exchange data to effectuate the data dependencies in the computational graph. This arrangement allows for high levels of parallelism and distributed execution, which is advantageous for computationally intensive operations, e.g., training a sophisticated machine learning model.

A computational graph can be generated by using a graph-building program written in a graph-building language. The graph-building language can be any appropriate programming language having a library for graph-building functions.

The graph-building program specifies the operations that should be executed for a particular problem or application. The graph-building library then translates the operations of the graph-building program into a representation of a computational graph. This mechanism can be referred to as a graph-building process. The graph-building process happens at graph-building time, to be distinguished from graph-execution time.

After a computational graph is built, the computational graph can be executed by a distributed computing system. The representation of the computational graph can be language-independent and OS-independent. Therefore, it is possible to run a graph-building program in one language and execute the resulting computational graph in a different language on a different OS.

Critical sections in traditional computer programs are sections of operations that can only be executed if a currently executing thread can acquire a lock resource that is maintained by the underlying operating system. This mechanism can be used to implement mutually exclusive updates to program objects that are accessible by multiple threads.

However, a program being executed as a computational graph on multiple machines has no underlying operating system to implement well-defined scoping boundaries of lock resources. In addition, deadlocks can result if the machines attempt to share a distributed lock resource. For example, if a machine crashes while holding a distributed lock resource, other machines will never be able to execute their critical sections. Therefore, traditional critical section mechanisms cannot be used for programs that represent computational graphs that are executed on distributed systems.

SUMMARY

This specification describes technologies for implementing critical sections in a computational graph to be executed on a distributed computing system. The critical sections can be implemented as subgraphs having operations that operate on a shared critical section object that is guaranteed to always be deleted even if machines in the distributed computing system crash during the critical section. This specification also describes techniques for defining critical sections in a dataflow graph and techniques for finding static deadlocks at graph building time.

In this specification, the term critical section subgraph or, for brevity, critical section, will refer to a subgraph of a computational graph. The critical section subgraph includes operations to create and delete a shared critical section object that is maintained by a value server. These creation and deletion operations act to lock and unlock the critical section so that only one task server at a time can execute a critical section for a shared critical section object having a particular name.

In general, one innovative aspect of the subject matter described in this specification can be embodied in methods that include the actions of receiving a representation of a computational graph having a critical section subgraph, the critical section subgraph specifying a lock operation, an unlock operation, and one or more other operations; executing, by a task server in a distributed computational graph execution system having a plurality of task servers and one or more value servers, the critical section subgraph including: executing the lock operation including providing, by the task server, a request to a value server to create a shared critical section object, determining, by the task server, that the shared critical section object was created by the value server, in response to determining that the shared critical section object was created by the value server, executing, by the task server, the one or more other operations of the critical section subgraph in serial, and executing, by the task server, the unlock operation including providing, by the task server, a request to the value server to delete the shared critical section object. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In particular, one embodiment includes all the following features in combination. The actions include executing, by a second task server, a second critical section including: executing a lock operation of the second critical section including providing, by the second task server, a request to the value server to create the shared critical section object, determining that the shared critical section object was not created, and in response to determining that the shared critical section object was not created, waiting for a notification that the shared critical section object was created before executing any other operations of the second critical section. The actions include determining, by the value server, that the task server did not successfully execute all operations of the critical section; in response, deleting the shared critical section object that was created by the task server. The actions include determining, by the value server, that a second task server is waiting on creation of the shared critical section object; and in response, creating, by the value server, the shared critical section object and notifying the second task server that the shared critical section object has been created. The actions include receiving, by the second task server, a notification that the shared critical section object was created; and in response, resuming execution of a critical section subgraph. Determining, by the value server, that the task server did not successfully execute all operations of the critical section comprises determining that the task server crashed. Determining, by the value server, that the task server did not successfully execute all operations of the critical section comprises determining that the task server encountered an error. The actions include executing a graph building program to generate an initial computational graph representation; performing a static deadlock process on the initial computational graph representation to determine that the initial computational graph representation has one or more deadlock conditions; and in response, modifying the initial computational graph representation, raising an error, or both. Determining that the initial computational graph representation has one or more deadlock conditions comprises determining that a particular operation has two ancestor operations, and wherein modifying the initial computational graph representation comprises inserting a control dependency into the graph that forces all operations of a first critical section subgraph to be executed before a second critical section subgraph attempts to acquire a lock. Determining that the initial computational graph representation has one or more deadlock conditions comprises determining that a critical section subgraph attempts to reacquire a same lock.

Particular embodiments of the subject matter described in this specification can be implemented so as to realize one or more of the following advantages. A computational graph system can implement critical section subgraphs to ensure mutually exclusive computation even in a distributed system and even when servers fail. The system can also perform static deadlock detection processes to identify when a particular computational graph has deadlock conditions. The system can then raise an error, modify the graph to remove the deadlock conditions, or both.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
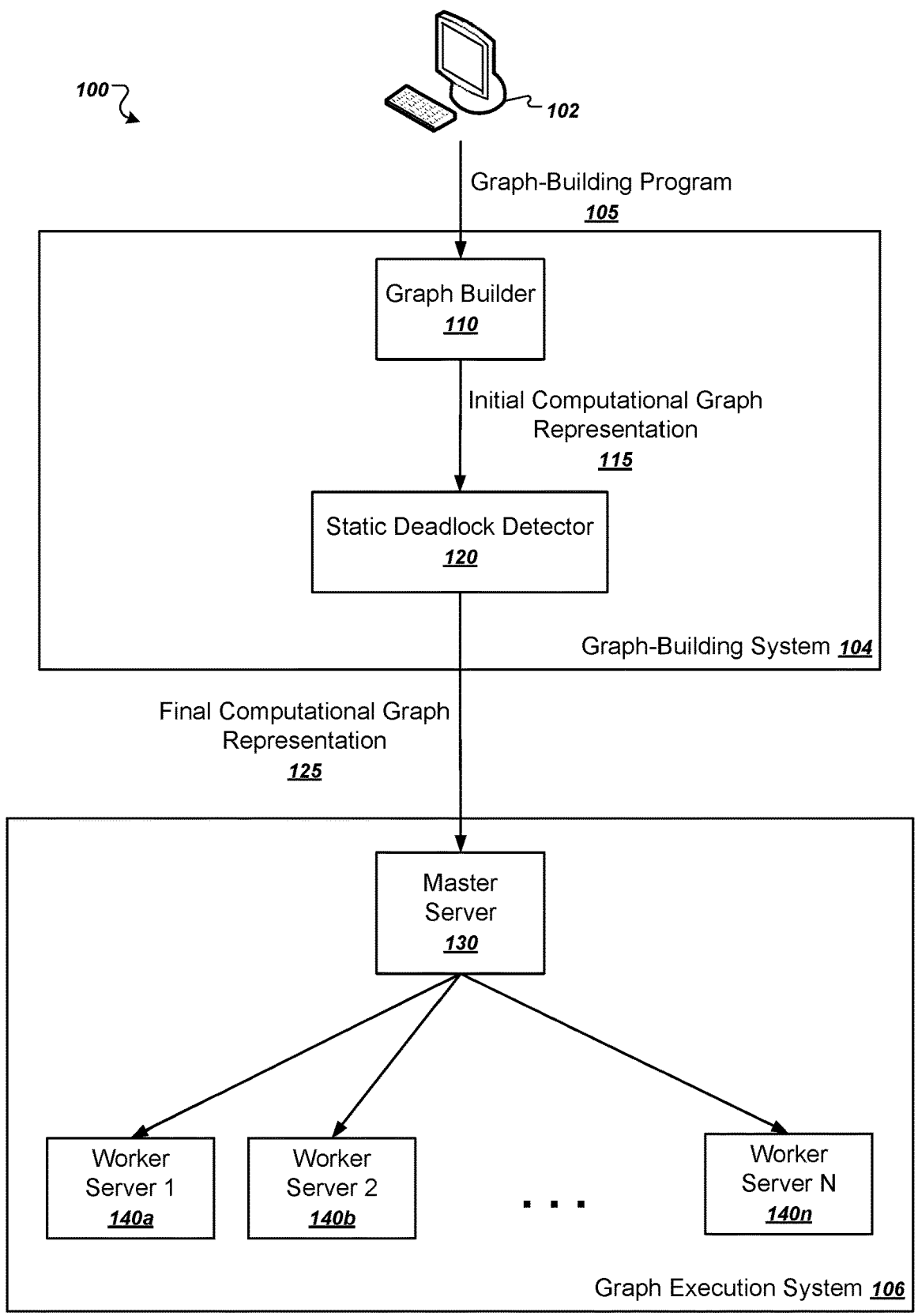
FIG. 1 illustrates an example system

FIG. 1 illustrates an example system 100. The system 100 includes a user device 102, a graph-building system 104, and a graph-execution system 106. The system 100 is an example of a system that can execute a program to generate a representation of a computational graph having a critical section subgraph to implement critical section functionality. The system 100 can execute the resulting computational graph on a distributed system having multiple computers.

The user device 102 can be any appropriate computing device capable of generating or storing a graph-building program 105. For example, the user device 102 can be a laptop or desktop computer, a mobile computing device, or a device in a cloud computing system that provides backend cloud storage for a user.

The user device 102 can provide a graph-building program 105 to the graph-building system 104. The graph-building system 104 takes as input a graph-building program 105 and uses a graph-building library to execute the graph-building program 105, which outputs a final computational graph representation 125 defined by execution of the graph-building program 105. The graph-building system 104 can be implemented as any appropriate combination of one or more local or remote computing devices. In some implementations, the graph-building system 104 is installed on the user device 102, the master server 130, or on one or more of the worker servers 140*a-n*. The graph-building system 104 includes a graph builder 110 and a static deadlock detector 120. Each of these modules can be implemented as one or more computer programs installed on one or more computing devices.

The graph builder 110 can execute the graph-building program 105 to generate an initial computational graph representation 115. Each computational graph representation is data that specifies operation node, data edges, and control edges, as described above. In some implementations, the graph builder 110 can be implemented as a runtime environment for an appropriate graph-building language having appropriate graph-building libraries installed. For example, the graph-builder 110 can be implemented as an interpreter for an interpreted language, e.g., Python, or a compiler for a compiled language, e.g., C++. The graph-building system 104 can then execute the compiled version of the graph-building program 105 to generate the initial computational graph representation 115.

The static deadlock detector 102 can inspect the initial computational graph 115 representation to determine whether the arrangement of nodes of critical section subgraphs in the initial computational graph representation 115 could cause a deadlock when the graph is executed by the graph-execution system 106. If the static deadlock detector 102 determines that a deadlock is possible, the static deadlock detector 102 can raise an error for a user of the user device 102, modify the initial computational graph representation 115, or some combination of these. For example, the static deadlock detector can insert control dependencies into the graph in order to force a particular sequence of execution that would avoid a deadlock. This functionality is described in more detail below with reference to FIG. 4.

The graph-building system 104 can provide the final computational graph representation 125 to the graph-execution system 106 for execution. In this specification, as a convenient shorthand, computations of the graph-execution system 106 will be described as being performed by nodes of a graph on data flowing through edges of the graph. The reality behind this shorthand is that the graph execution system 106 performs the operations represented by the nodes and provides data from one operation to another according to the flows defined by the directed edges of the graph. The operation represented by a node is performed when the data represented by the one or more edges directed into the node is available. The operation may be performed as soon as the data is available or at a later time determined by the system to satisfy, for example, resource availability or other constraints.

Some computational graphs represent operations that realize inference and backpropagation through a neural network. A neural network is a machine learning model that employs one or more layers of nonlinear units to predict an output for a received input. Some neural networks are deep neural networks that include one or more hidden layers in addition to an output layer. The output of each hidden layer is used as input to another layer in the network, i.e., another hidden layer, the output layer, or both. Some layers of the neural network generate an output from a received input and a respective set of parameters, while other layers of the neural network may not have parameters. The operations represented by a computational graph may be operations for the neural network to compute an inference, i.e., to process an input through the layers of the neural network to generate a neural network output for the input. Additionally or alternatively, the operations represented by a computational graph may be operations to train the neural network by performing a neural network training procedure to adjust the values of the parameters of the neural network, e.g., to determine trained values of parameters from initial values of the parameters using backpropagation. In some cases, e.g., during training of the neural network, the operations represented by the computational graph can be performed in parallel by multiple replicas of the neural network.

By way of illustration, a neural network layer that receives an input from a previous layer can use a parameter matrix and perform a matrix multiplication between the parameter matrix and the input. In some cases, this matrix multiplication is represented as multiple nodes in the computational graph. For example, a matrix multiplication can be divided into multiple multiplication and addition operations, and each operation can be represented by a different node in the computational graph. The operation represented by each node can generate a respective output, which flows from a node to a subsequent node on the directed edge. After the operation represented by a final node generates a result of the matrix multiplication, the result flows, as represented by a directed edge, to an operation represented by another node. The result in this example corresponds to an output of the neural network layer that performs the matrix multiplication.

In some other cases, the matrix multiplication is represented as one node in the graph. The operation represented by the node can receive, as inputs, an input tensor on a first directed edge and a weight tensor, e.g., a parameter matrix, on a second directed edge. The node can process, e.g., perform a matrix multiplication of, the input and weight tensors to output, on a third directed edge, an output tensor, which is equivalent to an output of the neural network layer.

Other neural network operations that may be represented by nodes in the computational graph include other mathematical operations, e.g., subtraction, division, and gradient computations; array operations, e.g., concatenate, splice, split, or rank; and neural network building block operations, e.g., softmax, sigmoid, rectified linear unit (ReLU), or convolution.

One or more nodes in a computational graph may represent dynamic, iterative control flow operations, e.g., nodes that represent conditional, recursive, and/or iterative control flow statements including: if statements, while loops, do-while loops, for loops, for-each loops, or nested control flow statements that include a combination of these statements.

The graph-execution system 106 has a master server 130 and multiple worker servers 140a, 140b, through 140n. Each of the master server 130 and the multiple worker servers 140a-n can be implemented as computer programs executed by any appropriate computing resources, e.g., physical machines, virtual machines, or containers in a cloud computing system, to name just a few examples. In some implementations, the master server 130 and the worker servers 140a-n can be implemented as computers programs that are all executed by the user device 102.

The master server 130 can effectuate execution of the final computational graph representation 125 by distributing respective subgraphs to each of the worker servers 140a-n. The worker servers 140a-n perform the operations defined by each subgraph and can generate a result for the subgraph computation. In some implementations, the master server 130 distributes independent graph-building programs to each of the worker servers 140a-n, which each build their own respective graphs and execute the resulting graphs.

In some implementations, each of the worker servers 140a-n is one of two types of server: a task server or a value server. Tasks servers generally hold no state and the graph execution system 106 allows a task server to fail and possibly be replaced by another task server. On the other hand, value servers do hold state of program objects during execution of the computational graph and therefore are not allowed to fail. In this context, this means that the graph execution system raises an error or exits graph computation whenever a value server fails, and the graph execution process must be restarted in whole or in part.

The worker servers 140a-n can provide the result of the subgraph computation back to the master server 130 or store the result of the subgraph computation in storage of the graph-execution system 106 so that the result can be read by one or more other servers or the user device 102.

Figure 2:
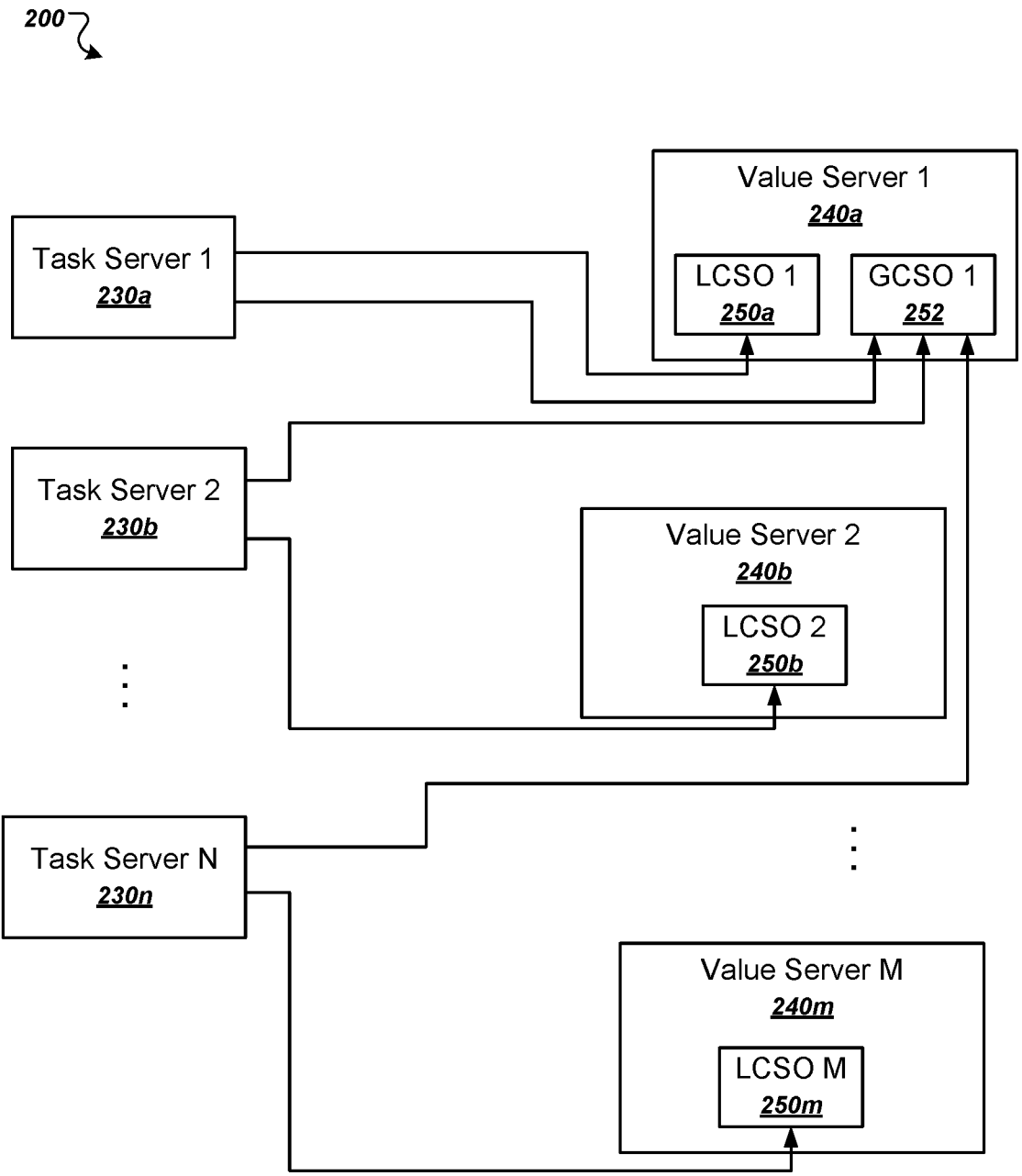
FIG. 2 illustrates an example graph-execution system having different types of servers.

FIG. 2 illustrates an example graph-execution system 200 having different types of servers. In particular, the graph-execution system 200 has a number of task servers 230a, 230b, through 230n, and a number of value servers 240a, 240b, through 240m.

In operation, a user device or a master server can provide respective computational graph representations to each of the task servers 230a-n. This process can involve the master server partitioning a computational graph into multiple subgraphs that each define respective subgraph operations.

The task servers 230a-n perform the operations defined by their respective subgraphs. This often requires obtaining and mutating values maintained by the value servers 240a-m. For example, to perform an addition operation on an object, the task server 230a can provide a read request for the object to the value server 240a. The value server 240a can then provide the currently value for the object to the task server

230a. After the task server 230a performs the addition operation, the task server 230a can provide the resulting value back to the value server 240a for storage. Therefore, many operations in the subgraphs have explicit or implicit read and write requests to a particular value server.

Critical section subgraphs can also have explicit or implicit read and write requests to a value server. A critical section subgraph can have a lock acquisition node that creates a shared critical section object, thereby effectuating acquisition of a critical section lock. A critical section subgraph can also have a lock release node that deletes the shared critical section object, thereby effectuating release of the critical section lock.

For example, to implement a lock acquisition node, the task server 230a can provide a create request to the value server 240a to create a local shared critical section object 250a. The local shared critical section object 250a has a name that is assigned by the graph-building program, which defines which critical section subgraphs require mutually exclusive execution. Thus, all critical section subgraphs that the program defines to require mutually exclusive execution will attempt to create and delete the same local shared critical section object 250a as defined by its name.

The system can also have one or more global shared critical section objects, e.g., the global shared critical section object 252. In general, a local shared critical section object can be created and deleted by a subset of the task servers, e.g., one task server. In contrast, a global shared critical section object can be created and deleted by any of the task servers 230a-n.

For example, the task server 1 230a can create and delete the local shared critical section object 250a as well as the global shared critical section object 252. Similarly, the task server 2 230b can create and delete the local shared critical section object 250b on value server 2 240b as well as the global shared critical section object 252, and the task server N 230n can create and delete the local shared critical section object 250m on value server M 240m as well as the global shared critical section object 252.

If the shared critical section object is successfully created by a value server, the task server making the request can continue to execute subsequent operations of its critical section subgraph. The final node in the critical section subgraph can be a lock release node. To execute the lock release node, the task server can provide a delete request to the value server to delete the shared critical section object that was created by the lock acquisition node.

The lock acquisition node of a critical section subgraph will stall if the shared critical section object already exists according to the corresponding value server. For example, if the other task server 230b provides a create request to the value server 240a to create a shared critical section object having the same name, the value server 240a can respond with an indication that the shared critical section object having that name already exists. The other task server 230b can then wait and periodically retry to create the shared critical section object or ask for an interrupt to resume execution when the shared critical section object is deleted.

In some implementations, the task servers 230a-n have no such persistence. In other words, if a task server crashes during operations of a critical section subgraph, the objects created by the task server are garbage collected by the corresponding value server. The garbage collection process can include deleting objects created by the task servers 230a-n. For example, when a task server executes a graph, the execution creates temporary objects in all value servers maintaining nodes in that task server's graph. The value servers can clean up all objects when the graph running session ends, regardless of whether the graph computation terminated successfully or due to a failure. The system can implement a critical section object to be a datatype such that the critical section object getting cleaned up by a value server has the effect of releasing the critical section lock. The system can ensure that this cleanup process happens as part of the regular execution of the program, so that there is no distinction between cleanup due to successful execution and cleanup due to errors.

Figure 3A:
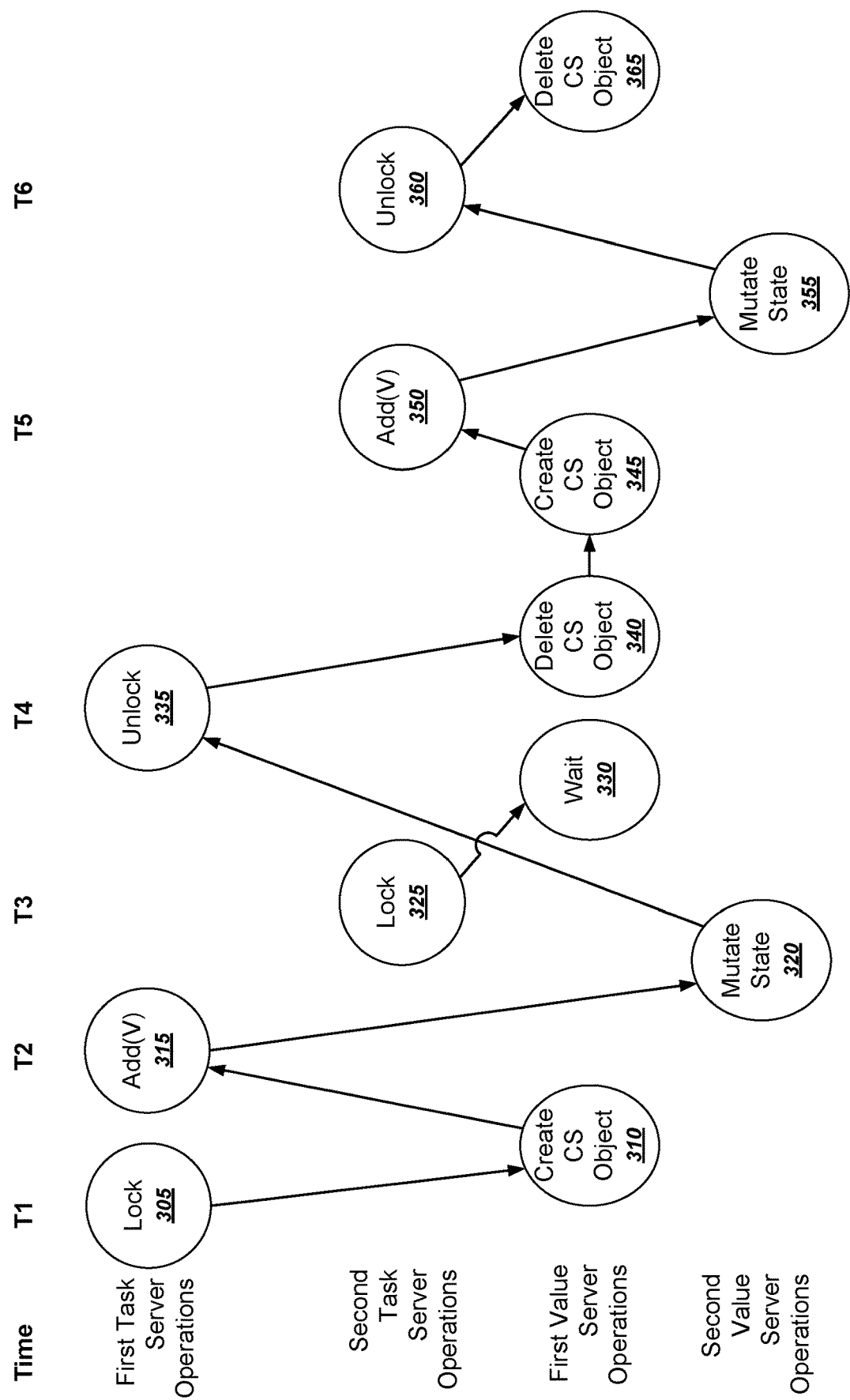
FIG. 3A illustrates two task servers concurrently executing critical section subgraphs with two value servers.

FIG. 3A illustrates two task servers concurrently executing critical section subgraphs with two value servers. The task servers will also communicate with two value servers to acquire and release critical section objects, and mutate the program state.

At time T1, the first task server executes a lock acquisition node 305. As mentioned above, executing a lock acquisition node can cause the task server to provide a request to a value server to create a shared critical section object. The lock acquisition node 305 completes successfully if the value server returns an indication that the shared critical section object was created successfully. In this example, the first value server successfully executes a create critical section object operation 310 and returns an indication of success to the first task server.

At time T2, the first task server executes a subsequent node in the subgraph, an add node 315 that performs an add operation on a variable V. As mentioned above, if the add operation acts on stateful variables, the add node 315 can include an implicit read request to the value server maintaining V, which in this case is the second value server, as well as an implicit write request to write the modified value of the variable V back to the second value server. The second value server thus begins executing a mutate state operation 320 to update the value of V.

At time T3, before the mutate state operation 320 is completed, the second task server executes a lock acquisition node 325. Executing the lock acquisition node 325 causes the second task server to provide a request to the value server maintaining the shared critical section object to create the shared critical section object. In this example, the first value server is maintaining the shared critical section object.

However, in this example, the shared critical section object already exists because it was created by the first value server. Therefore, the first value server executes a wait operation 330 to make the second task server wait. As described above, this can involve either not responding to the request or instructing the second task server to wait for a notification to resume computation.

At time T4, the first task server executes an unlock node 335. The unlock node 335 provides a delete request to the first value server for the shared critical section object.

The first value server thus performs a delete critical section object operation 340 that deletes the shared critical section object.

After deleting the shared critical section object, the first value server can effectuate the lock request for the second task server by recreating the shared critical section object and notifying the second task server. Thus, the first value server executes a create critical section object operation 245. This effectively restarts the second task server's execution of its critical section subgraph. The value server can maintain a queue of task servers that are waiting on their respective lock nodes to complete.

At time T5, the second task server executes an add node 350 that performs an add operation on the variable V. This includes an implicit read request to read and mutate the current value of the variable V from the second value server maintaining V. Thus, the second value server executes a mutate state operation 355.

This example illustrates the usefulness of critical sections for a distributed graph-execution system. If the system had allowed the second task server to perform the add node 350 at time T3, the first task server's own add node 315 could have generated an incorrect result depending on the unpredictable timing of the mutate state operation 320.

At time T6, the second task server performs an unlock node 360 to delete the current iteration of the shared critical section object. This results in a request to the first value server to perform a delete critical section object operation 365.

Figure 3B:
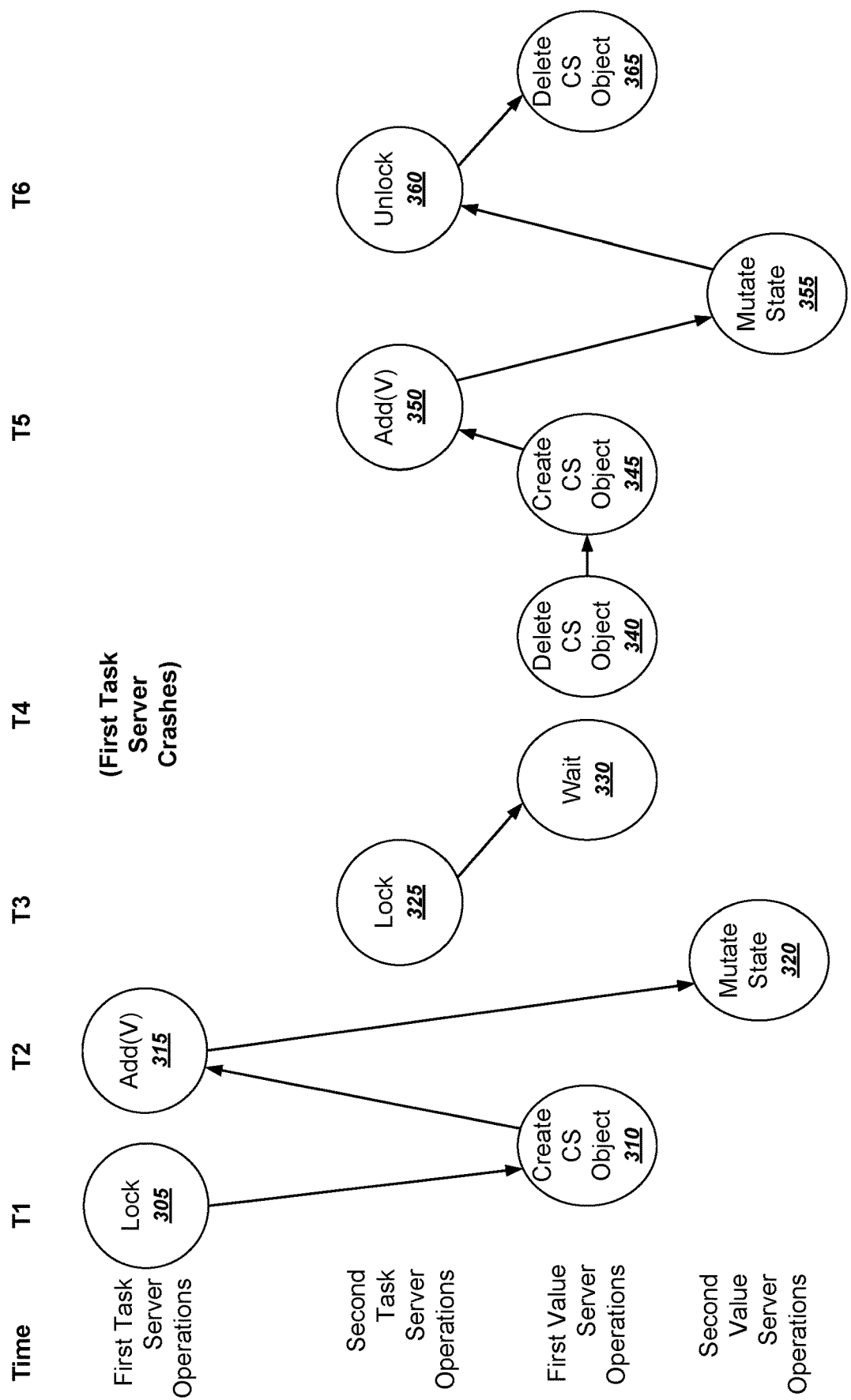
FIG. 3B illustrates how the value servers can guarantee release of a shared critical section object even when task servers crash in the middle of a critical section.

FIG. 3B illustrates how the value servers can guarantee release of a shared critical section object even when task servers crash in the middle of a critical section.

At time T1, the first task server executes the lock acquisition node 305, which causes the first value server to create the shared critical section object (310).

At time T2, the first task server executes the add node 315, which causes the second value server to begin mutating the value of the variable V (320).

At time T3, the second task server executes the lock acquisition node 325, which sends a create request to the first value server to create the shared critical section object. The shared critical section object already exists, so the first value server performs a wait operation 330.

At time T4, the first task server crashes. This causes the value servers to perform garbage collection for any variables or objects created by the first task server. For example, the value servers can maintain metadata that represents which variables or objects were created by each task server. If a value server receives a notification that one of the task servers crashes or otherwise becomes unresponsive, the value server can perform a garbage collection process on variables or objects owned by the task server.

As part of this process, the value server will perform garbage collection on the shared critical section object created by the lock node 305, which in this example causes the first value server to execute a delete critical section object operation 340 to delete the shared critical section object.

The first value server can then consult a queue of waiting task servers to determine that the second task server is waiting to execute its own critical section subgraph. The first value server can then effectuate the request of the lock node 325 by recreating the shared critical section object with a create critical section object operation 345 and notifying the second task server that the lock node 325 has successfully completed.

The second task server can then perform the remaining nodes of its critical section subgraph, e.g., by performing operations of the add node 350, which causes the second value server to perform a mutate state operation 355. The second task server then executes a final unlock node 360 that causes the first value server to perform a delete critical section object operation to delete the shared critical section object, thereby allowing other task servers to acquire it through their own lock nodes.

Figure 4:
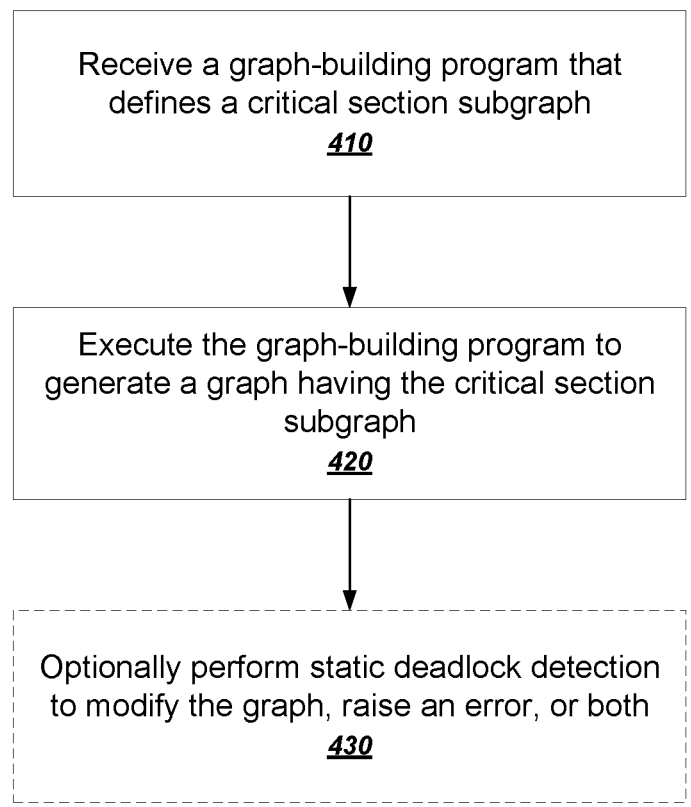
FIG. 4 is a flowchart of an example process for creating a computational graph having a critical section subgraph.

FIG. 4 is a flowchart of an example process for creating a computational graph having a critical section subgraph. For convenience, the process will be described as being performed by a system of one or more computers, located in one or more locations, and programmed appropriately in accordance with this specification. For example, a graph-building system, e.g., the graph-building system 104 of FIG. 1, appropriately programmed, can perform the example process.

The system receives a graph-building program defines a critical section (410). In general, the program construct that generates the critical section should take as an argument a subgraph of one or more operations to be wrapped by operations to lock and unlock the shared critical section object by communicating with the value server. In some implementations, the subgraph argument is specified in the graph-building language by the name of a function that defines the subgraph.

The following is example Python code for defining a function "count," which when executed by a graph-building system generates a subgraph that increments the variable v on the value server. This example is written for the open-source TensorFlow framework, which is an example of a suitable graph-building and graph-execution system. ("TensorFlow" is a trademark of Google, Inc.)

```
def count( ):
    value = v.read_value( )
    with tf.control_dependencies ([value]):
        with tf.control_dependencies([v.assign_add(1)]):
            return tf.identity(value)
```

Each of the "tf.control_dependencies" statements adds control dependencies to the graph. Therefore, the first "tf.control_dependencies" statement results in waiting for the value to be read from the value server. The second "tf.control dependencies" statement results in waiting for the value to be successfully incremented.

The following snippet of Python code declares a Critical Section object in the program and then uses the Critical Section program object to define critical section subgraphs for the operations in the function "count.":

```
cs = CriticalSection( )
f1 = cs.execute(count)
f2 = cs.execute(count)
output = f1 + f2
```

The CriticalSection constructor defines the shared critical section object that will be maintained and garbage collected by the value server. In some implementations, the CriticalSection constructor can reuse any appropriate existing datatype that that is garbage collected by a value server. For example, in the TensorFlow framework, tensors themselves are garbage collected, and therefore the CriticalSection constructor can have a tensor member that corresponds to the shared critical section object.

In this example, the second statement results in a critical section subgraph having operations of the subgraph defined by the function "count" and assigns the result of that subgraph to f1. This means that the operations defined by "count" are wrapped in the subgraph with implicit or explicit lock and unlock nodes that each make calls to the value server to create or delete a shared critical section object, respectively. Similarly, the third statement results in a critical section subgraph that has a critical section for the operations of the subgraph defined by the function "count" and assigns the result of that subgraph to f2.

Note that because of the parallelism of executing a computational graph, this example code does not guarantee that the second statement is executed before the third statement. However, in some implementations, being in a critical section does enforce serial execution of the operations of the critical section subgraph. In other words, while the assignment to f2 can happen before the assignment to f1, each execution of the subgraph defined by the "count" function can be executed in serial.

The program construct that generates the critical section can take other optional arguments as well. For example, the construct can take as an argument a name. Specifying a name can help a user to distinguish between multiple shared critical section objects. If no name is supplied, the system can automatically generate a name.

As another example, the program construct can also take as an optional argument an indication of whether resources required by the subgraph should be exclusive to the critical section. Typically the concept of critical sections means that the resources should be exclusive to the critical section. However, this may not be the case if the user wants only the serialization guarantees of a critical section and does not require resource exclusivity.

The system executes the graph-building program to generate a graph having a critical section subgraph having one or more nodes (420). As described above, the critical section can have implicit or explicit nodes that communicate with a value server to request creation or deletion of the shared critical section object. Thus, to generate graph, the system can generate respective nodes for the lock operation, the subgraph operations, and the unlock operation. To ensure serial execution, the system can also add explicit control dependencies for the lock node and the unlock node.

The system optionally performs static deadlock detection (430). After the graph the generated, the system can inspect the graph for deadlock conditions and modify the graph, raise an error, or some combination of these.

A first deadlock condition that the system can check for is an operation having two ancestor operations that try to acquire the same lock without an intervening release. In that case, the system can modify the computational graph by inserting a control dependency between the end of the first critical subgraph and the start of the second critical section subgraph. This new control dependency ensures that all operations in the first critical section subgraph are executed before attempting to acquire the lock again.

A second deadlock condition that the system can check for is a node in a critical section subgraph that attempts to acquire the same critical section. For example, in the "count" snippet above, if the code of the "count" function attempted to use the same critical section object "cs," the system can identify that as a deadlock condition. This type of deadlock condition may not be the kind of condition that can be solved by inserting control dependencies. Therefore, the system can instead raise an error during the graph-building process. The error can inform the user running the graph-building program of the location of the deadlock condition.

Figure 5:
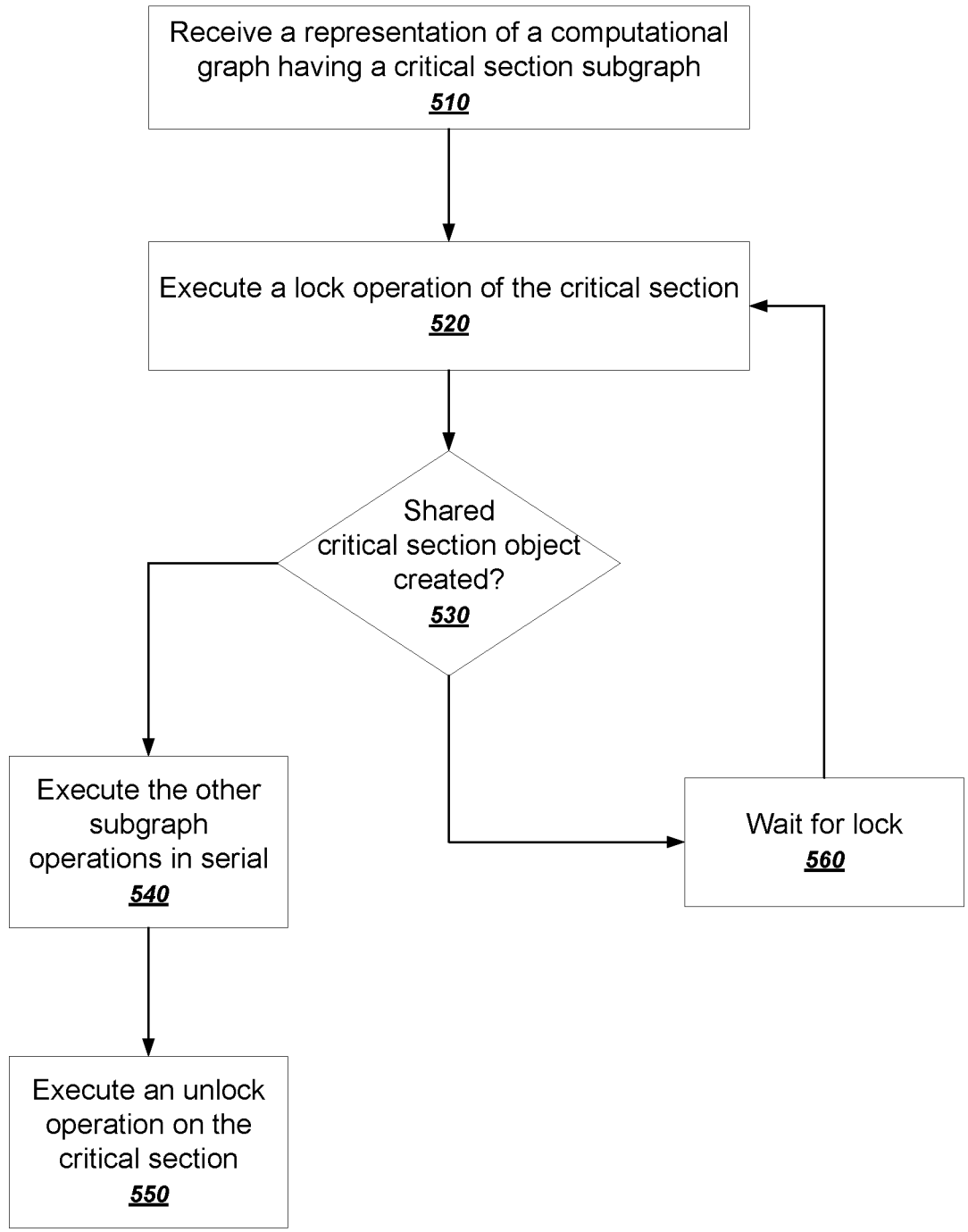
FIG. 5 is a flowchart of an example process for executing a computational graph having a critical section subgraph.

FIG. 5 is a flowchart of an example process for executing a computational graph having a critical section subgraph. For convenience, the process will be described as being performed by a system of one or more computers, located in one or more locations, and programmed appropriately in accordance with this specification. For example, a graph-execution system, e.g., the graph-execution system 106 of FIG. 1, appropriately programmed, can perform the example process.

The system receives a representation of a computational graph having a critical section subgraph (510). The graph can be a graph generated from executing a graph-building program as described above with reference to FIG. 4. Alternatively or in addition, the system can receive a graph generated in other ways or generated manually.

The system executes a lock operation of the critical section on a task server (520). A task server executing a critical section subgraph can perform a lock operation by providing a request to a value server to create a shared critical section object.

The system determines whether the shared critical section object was created (530). If the shared critical section object was created, the lock has been successfully acquired, and the system executes the critical section subgraph operations in serial (branch to 540). If creating the shared critical section object succeeds, the task server has successfully acquired the lock for the critical section. The task server can then perform the operations of the critical section subgraph in serial.

The system executes an unlock operation of the critical section on the task server (540). As described above, a task server that has finished executing the critical section subgraph can perform an unlock operation by providing a request to a value server to delete the shared critical section object.

If the shared critical section object was not created (530), the system waits for the lock (branch to 560). Waiting for the lock can include periodically retrying with the value server to create the shared critical section object. Alternatively or in addition, the task server can wait to be resumed by the value server as soon as the existing shared critical section object is deleted.

In alternative implementations, rather than creating and deleting a shared critical section object, the value server can maintain a single copy of the shared critical section object and define acquiring the lock as assigning a particular value to the shared critical section object and define releasing the lock as assigning a different particular value to the shared critical section object. Thus, the garbage collection process in the case of a crashed task server or another subgraph error can include resetting the value of the shared critical section object so that other task servers can acquire the lock.

In some implementations, the value server provides atomicity guarantees for operations in a critical section. In other words, the value server can ensure that all operations of a critical section are performed or all operations of a critical section are not performed. Therefore, if a value server determines that a task server has crashed in the middle of a critical section, the value server can roll back the changes that were performed during the critical section in addition to performing garbage collection processes.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising:
a plurality of computers and one or more storage devices storing instructions that are operable, when executed by the plurality of computers, to cause the plurality of computers to perform operations comprising:
receiving a representation of a computational graph having a first critical section subgraph and a second critical section subgraph, the first critical section subgraph and the second critical section subgraph each specifying a respective lock operation, a respective unlock operation, and one or more other operations, wherein, when executed, the respective lock operations and the respective unlock operations each initiate respective requests to a value server;
executing, by a first task server, the respective lock operation of the first critical section subgraph including providing, by the first task server, a request to the value server to create a first shared critical section object that is associated with a first identifier;
determining, by the first task server, that the first shared critical section object was created by the value server;
executing, by a second task server, the respective lock operation of the second critical section subgraph including providing, by the second task server, a request to the value server to create a second shared critical section object that is also associated with the first identifier;
denying, by the value server, the request to create the second shared critical section object based on the first identifier already being associated with the first shared critical section object that is currently maintained by the value server;
in response to determining that the first shared critical section object was created by the value server, executing, by the first task server, the one or more other operations of the first critical section subgraph in serial; and
executing, by the first task server, the respective unlock operation of the first critical section subgraph including providing, by the first task server, a request to the value server to delete the first shared critical section object.

2. The system of claim 1, wherein the operations further comprise:
in response to the value server denying the request to create the second shared critical section object, waiting, by the second task server, for a notification related to a status of the value server before executing any other operations of the second critical section.

3. The system of claim 1, wherein the operations further comprise:
determining, by the value server, that the first task server did not successfully execute all operations of the first critical section subgraph; and
in response, deleting the first shared critical section object that was created by the value server.

4. The system of claim 3, wherein the operations further comprise:
determining, by the value server, that the second task server is waiting on creation of the second shared critical section object; and
in response, creating, by the value server, the second shared critical section object and notifying the second task server that the second shared critical section object has been created.

5. The system of claim 4, wherein the operations further comprise:
receiving, by the second task server, a notification that the second shared critical section object was created; and
in response, resuming execution of the second critical section subgraph.

6. The system of claim 3, wherein determining, by the value server, that the first task server did not successfully execute all operations of the first critical section subgraph comprises determining that the first task server crashed.

7. The system of claim 3, wherein determining, by the value server, that the first task server did not successfully execute all operations of the first critical section comprises determining that the first task server encountered an error.

8. The system of claim 1, wherein the operations further comprise:
executing a graph building program to generate an initial computational graph representation;
performing a static deadlock process on the initial computational graph representation to determine that the initial computational graph representation has one or more deadlock conditions; and in response, modifying the initial computational graph representation, raising an error, or both.

9. The system of claim 8, wherein determining that the initial computational graph representation has one or more deadlock conditions comprises determining that a particular operation has two ancestor operations, and wherein modifying the initial computational graph representation comprises inserting a control dependency into the graph that forces all operations of one critical section subgraph to be executed before another critical section subgraph attempts to acquire a lock.

10. The system of claim 8, wherein determining that the initial computational graph representation has one or more deadlock conditions comprises determining that a critical section subgraph attempts to reacquire a same lock.

11. The system of claim 1, wherein the operations further comprise associating both the first shared critical section object and the second shared critical section object with the first identifier based on an indication that the first critical section subgraph and the second critical subsection require mutually exclusive execution.

12. A method comprising:

receiving a representation of a computational graph having a first critical section subgraph and a second critical section subgraph, the first critical section subgraph and the second critical section subgraph each specifying a respective lock operation, a respective unlock operation, and one or more other operations, wherein, when executed, the respective lock operations and the respective unlock operations each initiate respective requests to a value server;

executing, by a first task server, the respective lock operation of the first critical section subgraph including providing, by the first task server, a request to the value server to create a first shared critical section object that is associated with a first identifier;

determining, by the first task server, that the first shared critical section object was created by the value server;

executing, by a second task server, the respective lock operation of the second critical section subgraph including providing, by the second task server, a request to the value server to create a second shared critical section object that is also associated with the first identifier;

denying, by the value server, the request to create the second shared critical section object based on the first identifier already being associated with the first shared critical section object that is currently maintained by the value server;

in response to determining that the first shared critical section object was created by the value server, executing, by the first task server, the one or more other operations of the first critical section subgraph in serial; and executing, by the first task server, the respective unlock operation of the first critical section subgraph including providing, by the first task server, a request to the value server to delete the first shared critical section object.

13. The method of claim 12, further comprising:

in response to the value server denying the request to create the second shared critical section object, determining that the shared critical section object was not created, waiting, by the second task server, for a notification related to a status of the value server before executing any other operations of the second critical section.

14. The method of claim 12, further comprising:

determining, by the value server, that the first task server did not successfully execute all operations of the first critical section subgraph; and in response, deleting the first shared critical section object that was created by the value server.

15. The method of claim 14, further comprising:

determining, by the value server, that the second task server is waiting on creation of the second shared critical section object; and in response, creating, by the value server, the second shared critical section object and notifying the second task server that the second shared critical section object has been created.

16. The method of claim 15, further comprising:

receiving, by the second task server, a notification that the second shared critical section object was created; and in response, resuming execution of the second critical section subgraph.

17. The method of claim 14, wherein determining, by the value server, that the first task server did not successfully execute all operations of the first critical section subgraph comprises determining that the first task server crashed.

18. The method of claim 14, wherein determining, by the value server, that the first task server did not successfully execute all operations of the first critical section comprises determining that the first task server encountered an error.

19. The method of claim 12, further comprising:

executing a graph building program to generate an initial computational graph representation;

performing a static deadlock process on the initial computational graph representation to determine that the initial computational graph representation has one or more deadlock conditions; and in response, modifying the initial computational graph representation, raising an error, or both.

20. The method of claim 19, wherein determining that the initial computational graph representation has one or more deadlock conditions comprises determining that a particular operation has two ancestor operations, and wherein modifying the initial computational graph representation comprises inserting a control dependency into the graph that forces all operations of one critical section subgraph to be executed before another critical section subgraph attempts to acquire a lock.

21. The method of claim 19, wherein determining that the initial computational graph representation has one or more deadlock conditions comprises determining that a critical section subgraph attempts to reacquire a same lock.

22. One or more non-transitory computer storage media encoded with computer program instructions that when executed by a plurality of computers cause the plurality of computers to perform operations comprising:

receiving a representation of a computational graph having a first critical section subgraph and a second critical section subgraph, the first critical section subgraph and the second critical section subgraph each specifying a respective lock operation, a respective unlock operation, and one or more other operations, wherein, when executed, the respective lock operations and the respective unlock operations each initiate respective requests to a value server;

executing, by a first task server, the respective lock operation of the first critical section subgraph including providing, by the first task server, a request to the value server to create a first shared critical section object that is associated with a first identifier;

determining, by the first task server, that the first shared critical section object was created by the value server;

executing, by a second task server, the respective lock operation of the second critical section subgraph including providing, by the second task server, a request to the value server to create a second shared critical section object that is also associated with the first identifier;

executing, by a second task server, the respective lock operation of the second critical section subgraph including providing, by the second task server, a request to the value server to create a second shared critical section object that is also associated with the first identifier;

in response to determining that the first shared critical section object was created by the value server, executing, by the first task server, the one or more other operations of the first critical section subgraph in serial; and executing, by the first task server, the respective unlock operation of the first critical section subgraph including providing, by the first task server, a request to the value server to delete the first shared critical section object.

* * * * *